United States Patent
Nakamura

(10) Patent No.: US 6,686,064 B2
(45) Date of Patent: Feb. 3, 2004

(54) ELECTRIC LUMINESCENCE FIBER

(76) Inventor: Hideichi Nakamura, 1-4-1215, Kawara-machi, Saiwai-ku, Kawasaki-shi, Kawagawa 210-0907 (JP)

( * ) Notice: Subject to any disclaimer, the term of this patent is extended or adjusted under 35 U.S.C. 154(b) by 0 days.

(21) Appl. No.: 09/969,033

(22) Filed: Oct. 3, 2001

(65) Prior Publication Data

US 2002/0039666 A1 Apr. 4, 2002

(30) Foreign Application Priority Data

Oct. 3, 2000 (JP) .................................... 2000-304007

(51) Int. Cl.$^7$ ...................... D02G 3/00; H05B 33/00; G09F 13/22
(52) U.S. Cl. ................ 428/690; 428/364; 428/917; 313/506; 313/511; 313/512; 257/100
(58) Field of Search .................. 428/690, 364, 428/917; 313/506, 511, 512; 257/100

(56) References Cited

U.S. PATENT DOCUMENTS

| | | | |
|---|---|---|---|
| 5,485,355 A | * | 1/1996 | Voskoboinik et al. ......... 362/84 |
| 5,869,930 A | * | 2/1999 | Baumberg et al. ........... 313/506 |
| 6,074,071 A | * | 6/2000 | Baumberg et al. ........... 362/101 |
| 2001/0004808 A1 | * | 6/2001 | Hurwitz ....................... 36/137 |
| 2002/0130624 A1 | * | 9/2002 | Nakamura .................... 315/56 |

FOREIGN PATENT DOCUMENTS

| | | | |
|---|---|---|---|
| EP | 1026922 | * | 8/2000 |
| JP | 10-240181 | * | 9/1998 |
| JP | 2000-148050 | * | 5/2000 |

* cited by examiner

Primary Examiner—Cynthia H. Kelly
Assistant Examiner—Dawn Garrett
(74) Attorney, Agent, or Firm—Westerman, Hattori, Daniels & Adrian, LLP

(57) ABSTRACT

An electric luminescence fiber (ELF) can be maintained in any desired shape and can be used in wider applications, and an ELF with high functions can be produced in a simple manufacturing process and at low cost. A flexible luminescence substance (10) produced by arranging electrode wires in electric luminescence powder, where the electric luminescence powder is coated with thermoplastic resin, thermosetting resin, or UV-setting resin. The coated resin (11) is hardened and stabilized in linear or other desired shape, and the electric luminescence substance (10) inside the coated resin is maintained in the desired shape.

6 Claims, 3 Drawing Sheets

50
50a 50b 50c 50d 50e  51

50a~50e
51

61 Socket
60 Electric luminescence fiber

71 Leaf-like member
72 Socket
70 Electric luminescence fiber

1 Electric luminescence fiber
2 Colored tube 1
2
3 Electrode wires

Method for collective fixation using jig

ELECTRIC LUMINESCENCE FIBER

BACKGROUND OF THE INVENTION

The present invention relates to an electric luminescence fiber with stabilized shape.

An electric luminescence fiber (ELF) is conventionally produced as follows (referring to FIG. 9): Into a linear flexible substance, electric luminescence powder is placed and electrode wires 3 are arranged to produce a linear electric luminescence fiber 1. Further, this is covered with a colored tube 2. Voltage is applied between the electrode wires, and electric field is generated. Then, light is emitted from the fiber. In this case, color of the emitted light is determined by the color of the colored tube 2. By changing the color of the colored tube, lights with different colors can be emitted.

Another type of ELF has been proposed in JP-A-6-236797. Electrode wires are designed in shape of stranded wires. Electric luminescence powder is dispersed in epoxy resin, and this is placed in a spirally shaped space between the stranded wires. By increasing the percentage of the electric luminescence powder to emit light, the light emitting amount is increased and brighter ELF can be obtained.

A different type of ELF is proposed in JP-A-11-102782. When ELF is used alone, it is inferior in terms of strength, mountability, water resistance, light amount, decorative performance, etc. For this reason, ELF is placed spirally on or into inner surface of a transparent or semi-transparent tubular hose member, which has flexibility and elasticity.

ELF is flexible, and it is suitable for applications such as neon advertisement or decorative purposes and it is used by designing it in form of letters, characters, numerics, or many other shapes. However, ELF itself cannot maintain stabilized shape. When it is attempted to use it for neon advertisement or decorative purposes, it is necessary to maintain and stabilize the shape by supporting ELF by some means, and this has caused difficulties in the use of ELF in the past. To obtain brighter ELF, the coated electric luminescence powder should be placed in a spiral space, which is formed by stranded wires (electrode wires). However, the manufacturing procedure is complicated, and it also involves higher cost.

The method to place ELF spirally on or into inner surface of a tubular hose member also results in complicated manufacturing procedure and high cost.

To solve the above problems, it is an object of the present invention to provide an ELF, which can be maintained in any form as desired and can be used in wider applications and which has high functions and can be produced in simple manufacturing process and at lower cost.

SUMMARY OF THE INVENTION

The present invention provides an electric luminescence fiber, which comprises a flexible electric luminescence substance produced by arranging electrode wires in electric luminescence powder, said electric luminescence substance being coated with thermoplastic resin, thermosetting resin or UV-setting resin, said coated resin is hardened and stabilized in linear or any desired shape, and the electric luminescence substance inside the coated resin is maintained in said linear or any desired shape.

Also, the present invention provides an electric luminescence fiber, which comprises a flexible electric luminescence substance produced by arranging electrode wires in electric luminescence powder, said electric luminescence substance being coated with thermoplastic resin, thermosetting resin or UV-setting resin, said coated resin is hardened and is wound up in coil-like shape or in spirally stranded shape and is stabilized, and the electric luminescence substance inside the coated resin is maintained in coil-like shape or spiral shape.

Further, the present invention provides the electric luminescence fiber as described above, wherein said electric luminescence substance is maintained in a shape to simulate an object or in a shape to express letters, characters, numerics, a series of characters, or a series of numerics.

Also, the present invention provides the electric luminescence fiber as described above, wherein the electric luminescence fiber is wound up on a jig of a predetermined shape, the entire shape is stabilized, and the substance is cut for each unit to be designed in a predetermined shape.

DETAILED DESCRIPTION OF THE PREFERRED EMBODIMENT

Description will be given below on an embodiment of the present invention.

Figure 1:
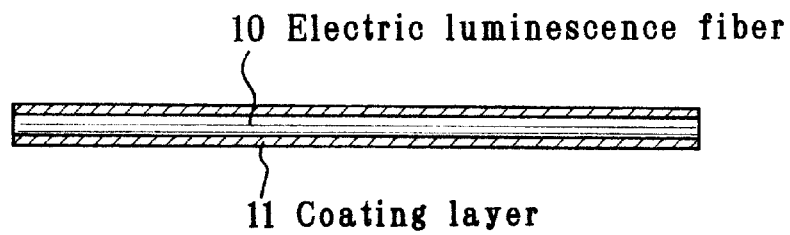
FIG. 1 is a drawing to explain a structure of an electric luminescence fiber according to the present invention.
Figure 9A:
FIG. 9 is a drawing to explain a conventional type electric luminescence fiber.
Figure 9B:

FIG. 1 is a drawing to explain an example of an electric luminescence fiber as used in the present invention. An electric luminescence fiber 10 corresponds to the fiber shown in FIG. 9. It comprises, for instance, an electric luminescence powder enclosed by a polyethylene film, for example a 2-core electrode wire arranged in linear form. When necessary, it may be covered with a colorless transparent or colored tube 2 as shown in FIG. 9. The electric luminescence fiber 10 is flexible and can be folded or bent in any shape as desired.

On the surface of the electric luminescence fiber 10, a coating layer 11 comprising thermoplastic resin such as polyurethane resin, polyester resin, epoxy resin, phenol resin, etc. is applied by an adequate method such as coating. For instance, the coating layer 11 is made of thermoplastic resin, which has such property that it is turned to plastic state when temperature is increased to 130° C.–150° C., and it is hardened at least at normal temperature. At the temperature, at which the coating layer 11 is turned to plastic state, the electric luminescence fiber 10 is folded or bent in linear or any other form as desired. Or, the thermoplastic resin is coated on the electric luminescence fiber 10 in linear or any desired form, and the coating layer 11 is formed. The temperature is decreased to normal temperature to harden the resin and to stabilize the form, and the form of the internal electric luminescence fiber 10 is maintained. A certain thickness is given to the coating layer 11 so that it can be stabilized in the desired shape. By the coating layer 11, it is possible to maintain the shape and to increase mechanical strength such as tensile strength. Thermosetting resin or UV-setting resin may be used instead of thermoplastic resin. Depending on the environment where the electric luminescence fiber is used, the resin suitable for the purpose may be used. In case of outdoor application, it is preferable to use a material with waterproof property.

Figure 2:
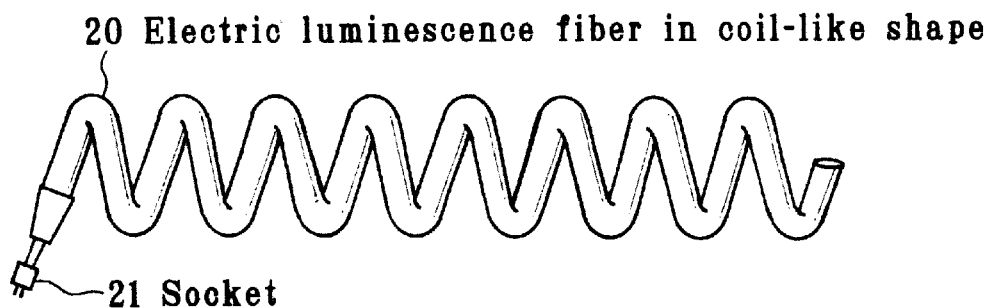
FIG. 2 is a drawing to explain an example of an electric luminescence fiber of the present invention designed in coil-like shape.

FIG. 2 shows an example of the electric luminescence fiber produced by winding up in coil-like (spiral) shape.

Thermoplastic resin, thermosetting resin or UV-setting resin is coated on the electric luminescence fiber, and this is wound up in spiral shape, or after the electric luminescence fiber is wound up in spiral shape, thermoplastic resin is coated. Temperature is decreased to normal temperature, and the resin is hardened to stabilize its shape, and the electric luminescence fiber positioned inside is maintained in coil-like or spiral shape. The coil-like electric luminescence fiber 20 thus formed can have higher coil resilient force when it is wound up in reverse direction. A socket 21 is mounted an one end of the coil-like electric luminescence fiber 20. When voltage is applied between electrode wires, light is emitted from the electric luminescence fiber. Because it is designed in coil-like shape, light emitting amount per unit length in axial direction can be increased. By increasing coil diameter, better visibility can be attained.

Figure 3:
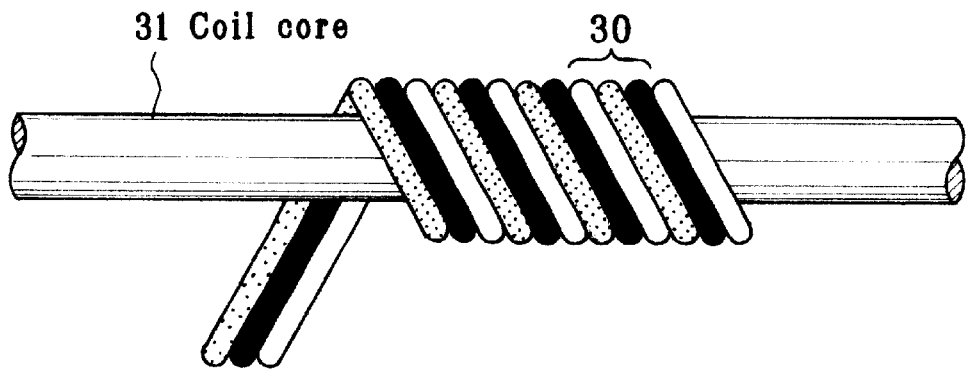
FIG. 3 is a drawing to explain an example of a plurality of the electric luminescence fibers being put together in coil-like shape.

When the electric luminescence fiber is wound up in coil-like shape, as shown in FIG. 3, a plurality of the electric luminescence fibers 30 (3 fibers in this example) are wound up on a coil core 31. Then, the fibers may be fixed and stabilized in coil-like shape by coating the resin for shape stabilization, and light emitting amount can be increased likewise. By changing colors of the three electric luminescence fibers 30, special effect can be obtained. For instance, when it is rotated, lights in different colors can be seen just like a spirally moving signboard.

Figure 4:
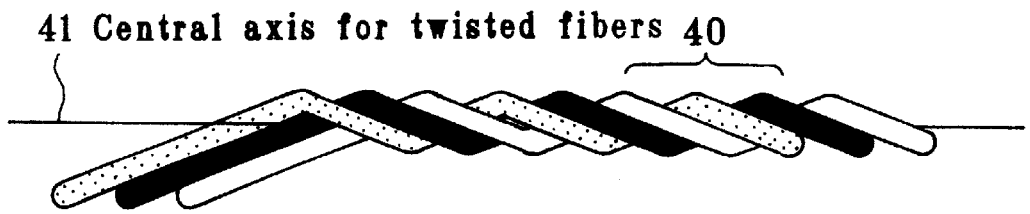
FIG. 4 is a drawing to explain a plurality of the electric luminescence fibers in twisted form.
Figure 5A:
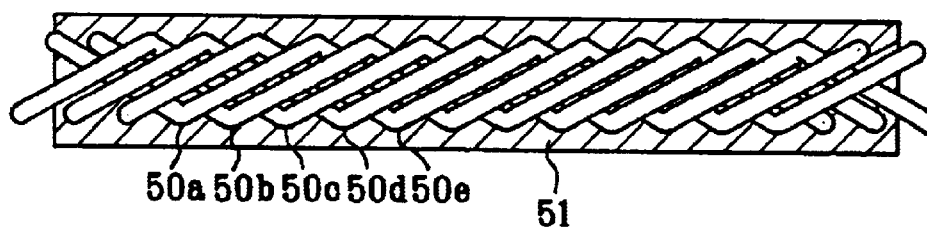
FIG. 5 is a drawing to explain a plurality of the electric luminescence fibers in form of stranded wires.
Figure 5B:

Also, as shown in FIG. 4, a plurality of electric luminescence fibers 40 may be intertwined and twisted around a central axis 41 so that the fibers are fixed and stabilized in twisted shape. For instance, as shown in FIG. 5, five electric luminescence fibers 50*a*–50*e* are twisted and intertwined to form a single stranded electric luminescence fiber 50. Then, a resin 51 for shape stabilization as described above is coated or infused to outer surface and to inner surface. Then, this is hardened and the shape is stabilized so that the inner stranded electric luminescence fibers 50 are maintained in the stabilized shape.

As described above, by fixing and stabilizing the fibers in coil-like shape or in stranded wire shape using the resin for shape stabilization, it is possible:

(1) to increase tensile strength of ELF;
(2) to ensure better mountability because the stranded wires can be maintained in a predetermined shape due to shape-maintaining function of the resin;
(3) to apply for outdoor use because the resin has water resistance property;
(4) to increase light emitting amount per unit length in axial direction by increasing number of fibers to be coiled or to be twisted, or by increasing coil diameter or spiral diameter;
(5) to provide better decorative effects by changing colors of the emitted light of the fibers to be coiled or to be twisted. This can be accomplished by single manufacturing process and at lower cost without using tubular hose member.

Figure 6:
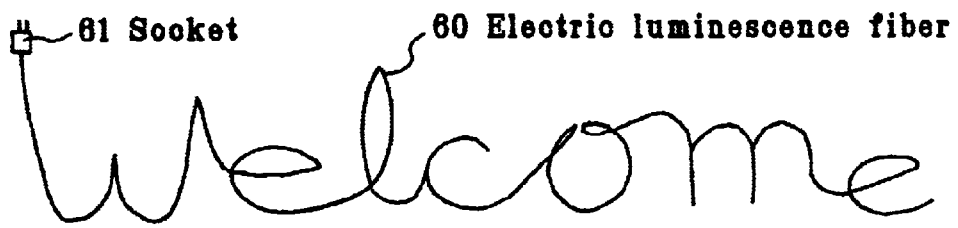
FIG. 6 is a drawing to explain an example of the electric luminescence fiber arranged in form of letters.

FIG. 6 shows a drawing to explain an example of the electric luminescence fiber of the invention, showing specific shape such as letters. By bending and folding the electric luminescence fibers in linear, spiral or stranded shape, letters or words can be designed, and an electric luminescence fiber 60 maintained in such desired shape can be formed. A socket 61 is mounted at one end and voltage is applied between the electrode wires. Then, the electric luminescence fiber emits light, and letters or words can be expressed. In this figure, letters for a word "welcome" is shown. Because of very simple arrangement and low cost, this can be effectively utilized for the purposes such as advertisement, decoration, etc. In case it is wanted to express many letters or to form complicated shape of 2-dimensional or 3-dimensional stretch, it should be designed in such manner that electric luminescence fibers with different shapes, each having a joint, are prepared in advance. Then, these are connected with each other and complicated shape can be formed.

Figure 7:
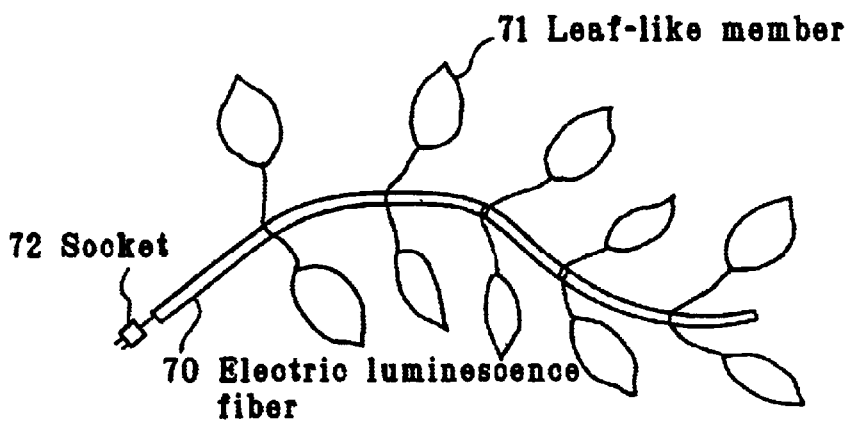
FIG. 7 is a drawing to explain an example of the electric luminescence fibers formed in a shape to simulate a part of a plant.

FIG. 7 shows an example where electric luminescence fiber in linear, spiral or stranded shape are bent and folded in a predetermined shape to simulate stalk, trunk or branch of a plant. To an electric luminescence fiber 70 maintained in the desired shape, leaf-like members 71 are attached to simulate a portion of a plant. When voltage is applied between electrode wires of the electric luminescence fibers via a socket 72 at the end of the electric luminescence fiber 70, ELF emits light. The entire stalk is illuminated and highlighted in bright color. In particular, at nighttime, this can be used for the purpose to simulate a plant beautifully illuminated.

As described above, the electric luminescence fiber can be fabricated in various shapes. Description will be given below on the procedure to fabricate it in efficient manner.

Figure 8:
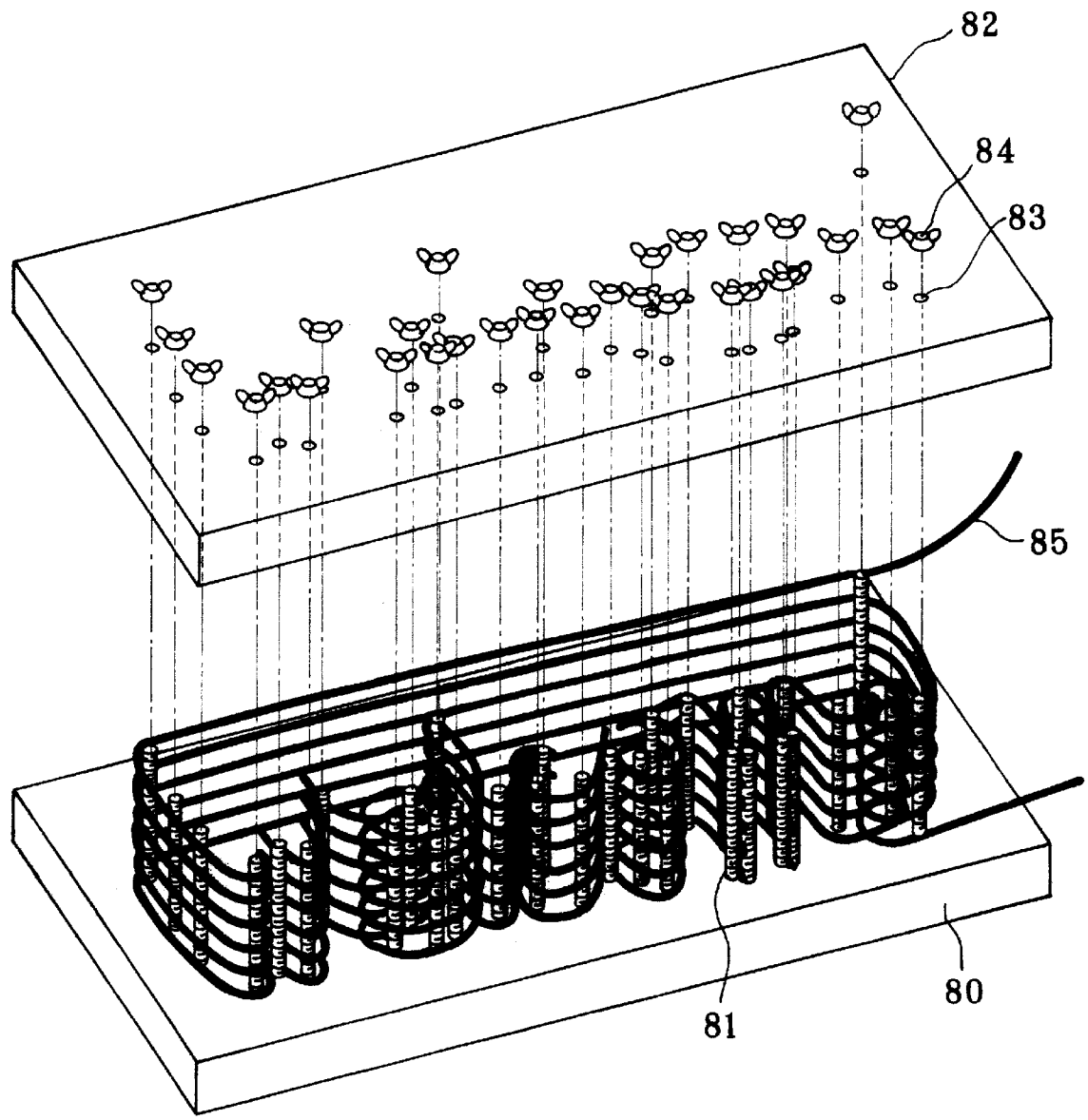
FIG. 8 is a drawing to explain an example for fixing the electric luminescence fibers together using jig.

FIG. 8 is a drawing to explain an example for collectively fixing and stabilizing the shape of the electric luminescence fibers using jig. On a plate 80, a plurality of threaded rods 81 are arranged and fixed in a predetermined pattern. On a plate 82, holes 83 are formed at positions to match the threaded rods 81. The threaded rods 81 are inserted into the holes 83 on the plate 82. Then, using thumb screws 84, the plate 82 can be pressed and fixed on the plate 80.

To collectively fix and stabilize the electric luminescence fibers, the electric luminescence fibers are wound up as shown in the figure along the threaded rods arranged in a predetermined pattern. Then, the threaded rods are inserted into the holes on the plate 82. Using the thumb screws 84, the plate 82 is screwed downward. Under this condition, thermoplastic resin, thermosetting resin, or UV-setting resin, etc. is coated. Then, the resin is hardened and the entire member is quickly fixed and stabilized. Subsequently, by cutting this for each unit size at each of predetermined positions, it is possible to accomplish mass production of neon signs, which had to be fabricated manually one by one in the past. Logos, configurations, letters, etc. with the same design can be produced at one time and in large quantity.

As described above, thermoplastic resin, thermosetting resin, or UV-setting resin is coated on the electric luminescence fiber. Then, the coated resin is stabilized in shape and inner electric luminescence fiber can be designed in the desired shape. As a result, light can be emitted in any desired shape to form letters, numerics, words, etc. This can be conveniently used for applications such as neon advertisement or decorative purposes. By winding up the electric luminescence fiber in coil-like shape or in form of stranded wires and by maintaining the shape, it is possible to increase light emitting amount per unit length in axial direction, and the electric luminescence fibers with bright color and light can be obtained. By increasing the coil diameter, better visibility can be attained. Further, by changing colors of the fibers to be coiled or the fibers to be twisted, better decorative effects can be obtained.

What is claimed is:

1. An electric luminescence fiber, comprising a flexible electric luminescence powder, electrode wires arranged in said in electric luminescence powder, a resin coating around said electric luminescence powder and wires, said resin comprising thermoplastic resin, thermosetting resin or UV-setting resin, wherein said resin coating is sufficiently hard to keep the electric luminescence fiber stable in a desired shape, whereby the electric luminescence substance inside the coated resin is maintained in said shape and light is emitted from the electric luminescence fiber while in the stable desired shape.

2. An electric luminescence fiber, comprising a flexible electric luminescence powder, electrode wires arranged in said in electric luminescence powder, and a resin coating around said electric luminescence powder and wires, said resin comprising thermoplastic resin, thermosetting resin or UV-setting resin, wherein said resin coating is sufficiently hard to keep the electric luminescence fiber stable in a coil-like or a in spirally stranded shape whereby the electric luminescence substance inside the coated resin is maintained in said coil-like shape or spiral shape and light is emitted from the electric luminescence fiber while in the coil-like shape or the spiral shape.

3. The electric luminescence fiber according to claim 1 or 2, wherein said electric luminescence substance is maintained in a shape to simulate an object or in a shape to express letters, characters, numerics, a series of characters, or a series of numerics.

4. The electric luminescence fiber according to claim 1 or 2, wherein the electric luminescence fiber is wound up on a jig of a predetermined shape, the entire shape is stabilized, and the substance is cut for each unit to be designed in a predetermined shape.

5. The electric luminescence fiber according to claim 1, wherein the resin coating comprises a predetermined thickness so that the coating layer is stabilized in the shape.

6. The electric luminescence fiber according to claim 2, wherein the resin coating comprises a predetermined thickness so that the coating layer is stabilized in the coil-like shape or the spiral shape.

* * * * *